Oct. 6, 1970  H. A. DOWNEY  3,531,949

SHAFT COUPLING SYSTEM

Filed Oct. 28, 1968  2 Sheets-Sheet 1

INVENTOR.
HOLMES A. DOWNEY
BY Hobbs & Green
ATTORNEYS

INVENTOR.
HOLMES A. DOWNEY
BY Hobbs & Green
ATTORNEYS

United States Patent Office 3,531,949
Patented Oct. 6, 1970

---

3,531,949
SHAFT COUPLING SYSTEM
Holmes A. Downey, Bremen, Ind., assignor to Reliance Electric Company, a corporation of Delaware
Filed Oct. 28, 1968, Ser. No. 771,090
Int. Cl. F16d 3/64
U.S. Cl. 64—11
12 Claims

ABSTRACT OF THE DISCLOSURE

A shaft coupling system having a coupling mounted on a drive shaft, a coupling mounted on a driven shaft, and a floating shaft interposed therebetween. The couplings include two opposed shaft flanges with radial flanges thereon connected by a flexible element, and the flexible element is joined to the radial flanges either by a pair of removable clamping rings, or a clamping ring and a disc-shaped member which also supports one end of the floating shaft.

---

In some power equipment installations difficulty is encountered in aligning the motor shaft with the input shaft of the driven equipment and in maintaining proper shaft alignment during operation, and in such installations a single flexible coupling is normally used in connecting the motor and input shafts, thus permitting some degree of misalignment without causing any adverse effect on the operation of the installation. However, in some installations, the degreee of misalignment between the two shafts may be such that the single flexible coupling can not compensate for the misalignment sufficiently to obtain optimum performance without undue wear on the shaft bearings and/or the flexible element. A dual flexible coupling system is sometimes employed with a floating shaft between the couplings, providing in effect a limited universal coupling which will effectively transmit the power from the drive to the driven shaft, but will also readily adjust to both angular and axial misalignment over a wide range without adversely affecting the optimum operation of the installation. In the past these multiple flexible coupling installations have involved a variety of different shaft connections which have required the use of a relatively large number of different types of coupling flanges and fixtures for completing and servicing the instalations, and have required maintaining a large inventory of parts for the various types of installations. It is therefore one of the principal objects of the invention to provide a power transmission system consisting of two spaced flexible couplings and an interconnecting floating shaft in which the principal parts of the couplings are interchangeable with other similar parts, and can be used in a variety of different systems and on various types of drive and driven shafts, thus eliminating the need for a large inventory or stock pile of major components of the couplings.

Another object of the invention is to provide a relatively simple and versatile shaft coupling which has a flexible element clamped in operating position by separate rings removably mounted on the shaft flanges, interchangeable with other similar types of element clamping rings, and which has shaft flanges of simple and compact construction on which the rings can readily be assembled and removed.

Still another object is to provide couplings for use in the aforesaid system in which the support bearing for the floating shaft is contained in a removable plate which forms one of the clamping members for the flexible element in place of one of the removable clamping rings on one side of the element, and the dual removable clamping rings are used on the other side of the element.

Figure 1:
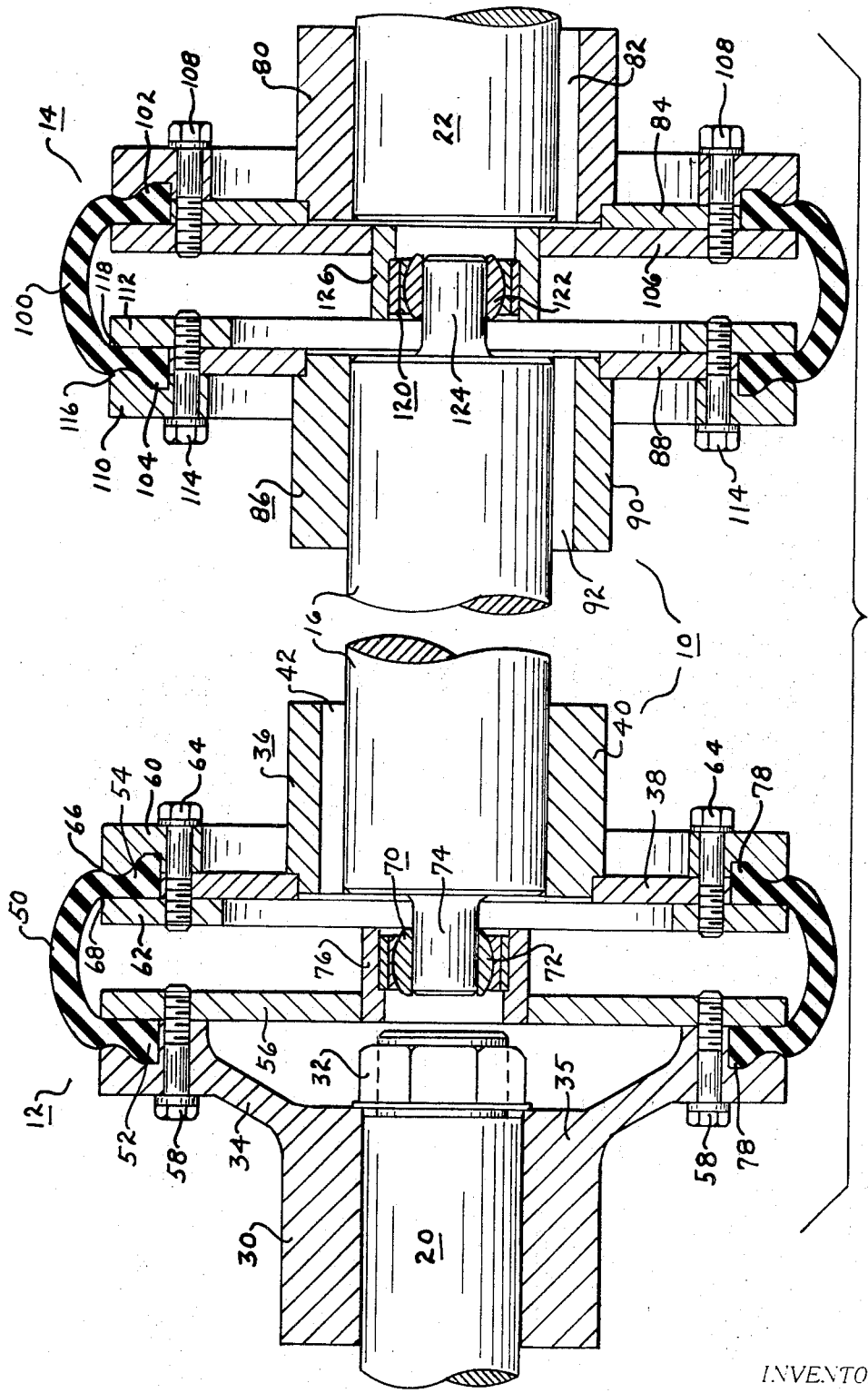
Figure 2:
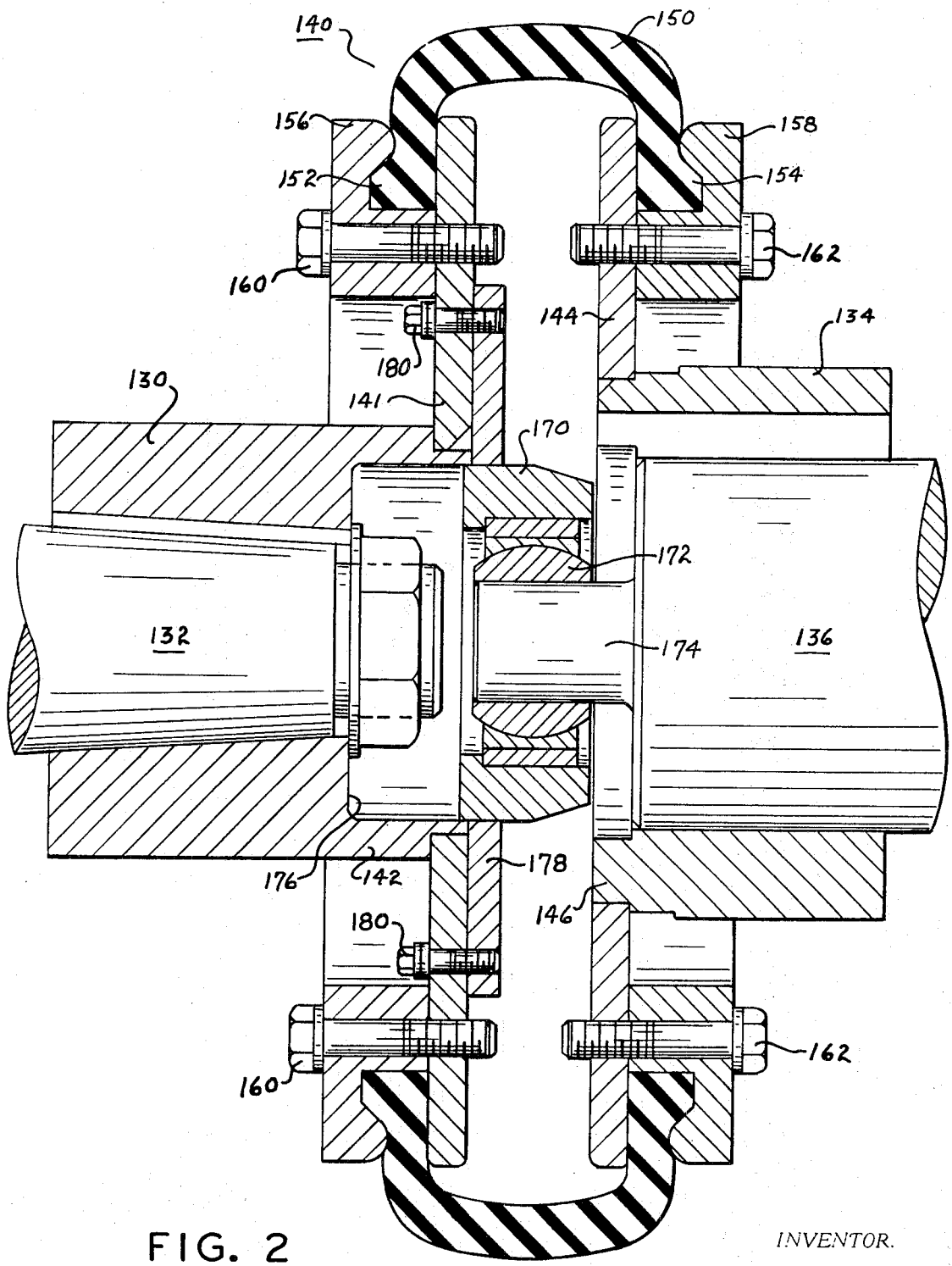

Additional objects and advantages of the invention will become apparent from the following description and accompanying drawings, wherein:

FIG. 1 is an axial cross sectional view of a shaft coupling system, the principal parts thereof being of annular or cylindrical shape on the principal axis of the system; and FIG. 2 is a longitudinal cross sectional view of a coupling of the general type shown in FIG. 1, illustrating a modified form of coupling which may be used in the system.

Referring more specifically to the drawings and to FIG. 1 in particular, numeral 10 designates generally the present coupling system, consisting basically of couplings 12 and 14 and interconnecting floating shaft 16. One coupling is mounted on a drive shaft, such as a motor shaft, and the other coupling is mounted on a driven shaft, and the two couplings are connected by floating shaft 16, which may be of any suitable length. In many installations of the type for which the present coupling system has been developed, satisfactory direct alignment between the drive and driven shafts is difficult to obtain and maintain. Further, the requirements from one such installation to another often vary substantially both as to the nature of the drive and driven equipment and the types of the two shafts on which the system is mounted. In FIG. 1, the drive shaft is indicated by numeral 20 and the driven shaft by numeral 22, the former normally being for an electrical motor.

Coupling 12 consists of a shaft flange, generally indicated by numeral 30, mounted on shaft 20, held thereon by a nut 32 on the end of shaft 20, and having a generally radially extending flange portion 34 formed integrally with sleeve 35. A shaft flange 36 is secured to floating shaft 16 and contains a radially extending annular flange 38 joined integrally to a hub portion 40 by welding or other suitable means. The flange 38 is held against relative rotation with respect to the floating shaft by a key 42 seated in key-ways in the hub and shaft. The two shaft flanges 30 and 36 are interconnected by an annular flexible element 50 which transmits the torque force from the motor shaft and flange 30 to flange 36 and shaft 16. Element 50 has inwardly extending side walls 52 and 54, one wall of which is clamped between flange 34 and an internal clamping plate 56 by a plurality of screws 58 extending through flange 34 and received in corresponding threaded holes in plate 56, and the other wall of which is clamped between external and internal clamping rings 60 and 62 by screws 64 extending through clamping ring 60 and threadedly received in corresponding threaded holes in ring 62 and, when tightened, the screws firmly clamp the respective side wall between the clamping areas 66 and 68 near the external periphery of rings 60 and 62, respectively. These two rings are interchangeable and other similar rings, thus permitting the coupling to be adapted to various types of flexible elements and/or to various types of flanges corresponding to part 36.

Plate 56 contains a centrally located bushing assembly 70 having a spherical pivoted bushing 72 for receiving stub shaft 74 joined integrally in an axial position with the corresponding end of floating shaft 16. The bushing assembly is supported by a hub 76 joined integrally to and at the center of plate 56. Plate 56, of the type shown in the drawing, may be interchanged with similar types of plates to support different bushing assemblies for various floating shafts.

The flexible element 50 is of a well known construction, consisting essentially of an annular rubber body reinforced with fabric or other suitable flexible material which permits the element to flex readily to adjust itself to various types of misalignment between the drive and driven shafts and the interconnecting floating shaft. The inner edges of the two side walls 52 and 54 are also fabric reinforced and generally contain an outwardly extending flange or bead portion 78 along the inner edges for seating in the annular grooves formed by the respective clamping rings.

Flexible element 14, which is essentially the same as the flexible element 12, includes a flange 80 mounted on shaft 22, keyed thereto by key and key-ways 82, and having a generally radially extending flange portion 84. A flange 86 is secured to floating shaft 16 and contains a radially extending annular flange 88 joined integrally to hub 90 by welding or other suitable means. The hub is held against relative rotation with respect to the floating shaft by a key 92 seated in the key-ways in the hub and shaft. The two flanges 80 and 86 are connected by an annular flexible element 100, having inwardly extending side walls 102 and 104, one wall of which is clamped between flange 84 and an internal clamping plate 106 by a plurality of screws 108 extending through flange 84 and received in corresponding threaded holes in plate 106, and the other wall of which is clamped between the external and internal clamping rings 110 and 112 by screws 114 extending through clamping ring 110 and threadedly received in corresponding threaded holes in ring 112. The screws 114 extend through unthreaded corresponding holes in flange portion 88, and when tightened, the screws firmly clamp the respective side wall between the clamping areas 116 and 118 near the periphery of rings 110 and 112, respectively. These two rings are interchangeable with other corresponding rings to adapt the coupling to various types of flexible elements and/or to various types of flanges corresponding to part 86.

Plate 106 contains a bushing assembly 120 having a spherical pivoted bushing 122 for receiving stub shaft 124 joined integrally in an axial position with the corresponding end of floating shaft 16. The bushing assembly is supported by a hub 126 joined integrally to the center of plate 106. Plate 106, of the type shown in the drawings, may be interchanged with similar types of plates to support different bushing assemblies for the floating shaft.

The flexible element 100 is normally of the same construction and design as element 50 previously described herein, consisting essentially of a reinforced annular rubber body reinforced with fabric or other suitable flexible material which permits the element to flex readily to adjust itself to various types of misalignment between the drive and driven shafts and the interconnecting floating shaft. The inner edges of the two side walls 102 and 104 are normally also fabric reinforced and generally contain an outwardly extending flange or bead portion in the inner end for seating in the annular grooves formed by the respective clamping rings.

With reference to the modified form shown in FIG. 2, numeral 130 indicates a shaft flange mounted on shaft 132 of the drive or driven shaft, and numeral 134 indicates a shaft flange mounted on floating shaft 136. The floating shaft is similar to floating shaft 16 and connects coupling 140 with a coupling of similar construction and design (not shown). Shaft flange 130 contains a plate-like radial flange 141 joined integrally by welding or other suitable joining means to hub 142. Flange 134 has a similar radial flange 144 joined integrally to hub 146. A flexible element 150 interconnects the two flanges 130 and 134 and consists of an annular body with inwardly extending side walls 152 and 154 clamped between flanges 141 and 156 and rings 144 and 158, respectively. The rings are secured to the respective flanges by screws 160 and 162 extending through holes in the respective rings and into threaded holes in radial flanges 141 and 144. The flexible element is similar in construction and function to elements 50 and 100 previously described herein, and is adapted to transmit a torque force from flange 130 to flange 134 and thence through floating shaft 136 to the second coupling of the power transmission system.

Floating shaft 136 is supported in coupling 140 by a bushing assembly 170 having a spherical bushing 172 mounted therein and journalling stub shaft 174. The assembly is seated in a recess 176 in the adjacent end of flange 130. The assembly is joined rigidly to flange 130 by a disc shaped member 178 joined to the assembly by welding or other suitable securing means, and supported on radial flange 141 by a plurality of bolts 180 extending through the flange and into threaded holes in disc-shaped member 178.

In the two embodiments of the present invention described herein, the shaft flanges may be interchangeable with similar shaft flanges to permit the couplings of the system to be easily adapted to various types of drive and driven equipment installations. Likewise, the rings 60 and 62 of coupling 12 and rings 110 and 112 of coupling 14 may be interchanged with similar rings to adapt the coupling to different flexible elements. Likewise, the plates 56, 106 and 178, containing the floating shaft bushing assemblies, may be interchanged with similar units for providing the desired bushing assembly for various installations. Thus, it is seen that one of the advantages of the present shaft coupling system is the adaptability of the system by interchangeable parts to various installations, thus eliminating the normal requirement of maintaining a substantial inventory to assemble the different types of coupling systems and for servicing and repairing such systems.

While only two embodiments of the present invention have been described in detail herein, various changes and modifications may be made without departing from the scope of the invention.

I claim:

1. A shaft coupling system for connecting two spaced shafts in end-to-end relation, comprising two spaced couplings and a shaft interposed therebetween, each of said couplings having a flange for connection to said intreposed shaft, a sleeve for connection to one of said spaced shafts, radial annular flanges on said sleeve and shaft flange, a flexible element interconnecting said radial flanges, a ring removably secured to each of said radial flanges near the periphery for securing said element to said radial flanges, and a member secured to the radial shaft flange on said sleeve and having a bushing directly supporting an end of said interposed shaft.

2. A shaft coupling system as defined in claim 1 in which a second ring is used with said first ring for securing said element to the respective radial flange.

3. A shaft coupling system as defined in claim 2 in which said rings are positioned on opposite sides of said radial flange and a plurality of screws extend through said rings and said flange for retaining said rings and said element in operating position.

4. A shaft coupling system as defined in claim 2 in which a plurality of screws secure said bushing supporting member to the respective flange.

5. A shaft coupling system as defined in claim 1 in which said bushing supporting member cooperates with the respective flange ring for clamping said element in operating position.

6. A shaft coupling system as defined in claim 5 in which said bushing supporting member is generally disc-shaped and is substantially co-extensive with said radial flange.

7. A shaft coupling system as defined in claim 1 in which a plurality of screws secure said bushing supporting member to the respective flange.

8. A shaft coupling system as defined in claim 1 in which each radial flange has two rings removably secured thereto for retaining said element in operative position.

9. A shaft coupling system as defined in claim 1 in which said bushing supporting member is disc-shaped and secured to one radial flange and a second ring removably secured to the shaft flange for the interposed shaft cooperates with said first mentioned ring to attach said element to said last mentioned flange.

10. A shaft coupling comprising spaced shaft flanges having radial annular flange portions thereon, a flexible element interconnecting said radial flange portions, a pair of removable rings mounted on one of said radial flange portions, screws extending through said rings and the respective radial flange portions on one side of said element to secure said element to the respective radial flange portion, and means securing the other side of said element to the other radial flange portion.

11. A shaft coupling as defined in claim 10 in which said rings are mounted on opposite sides of the respective radial flange portion.

12. A shaft coupling as defined in claim 11 in which said means securing the rings to the respective radial flange consists of a plurality of spaced screws extending through one of said rings and radial flange portion and being threadedly received in holes in the other of said rings.

References Cited

UNITED STATES PATENTS

| | | | |
|---|---|---|---|
| 1,501,187 | 7/1924 | Rayfield | 64—11 |
| 1,657,291 | 1/1928 | Weiland | 64—11 |
| 2,154,077 | 4/1939 | Sampson | 64—11 |
| 2,747,386 | 5/1956 | Ayling | 64—11 |
| 3,178,906 | 4/1965 | Ricketts | 64—11 |
| 3,233,427 | 2/1966 | Firth | 64—11 |
| 3,385,080 | 5/1968 | Sorenson | 64—11 |

FOREIGN PATENTS 923,640   2/1955   Germany.

JAMES A. WONG, Primary Examiner